US012793319B2

(12) United States Patent
Shin et al.

(10) Patent No.: US 12,793,319 B2
(45) Date of Patent: Nov. 10, 2026

(54) METHOD FOR DECODING IMMERSIVE VIDEO AND METHOD FOR ENCODING IMMERSIVE VIDEO

(71) Applicant: Electronics and Telecommunications Research Institute, Daejeon (KR)

(72) Inventors: Hong Chang Shin, Daejeon (KR); Gwang Soon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 293 days.

(21) Appl. No.: 18/488,115

(22) Filed: Oct. 17, 2023

(65) Prior Publication Data

US 2024/0185504 A1 Jun. 6, 2024

(30) Foreign Application Priority Data

Oct. 19, 2022 (KR) ........................ 10-2022-0135209
Jan. 9, 2023 (KR) ........................ 10-2023-0003122
Jan. 10, 2023 (KR) ........................ 10-2023-0003708
Jan. 17, 2023 (KR) ........................ 10-2023-0006952

(51) Int. Cl.
*G06T 15/04* (2011.01)
*G06F 3/01* (2006.01)
*G06T 3/16* (2024.01)
*G06T 15/50* (2011.01)

(52) U.S. Cl.
CPC .............. *G06T 15/04* (2013.01); *G06F 3/011* (2013.01); *G06T 3/16* (2024.01); *G06T 15/506* (2013.01); *G06T 2215/12* (2013.01)

(58) Field of Classification Search
CPC ......... G06T 15/04; G06T 3/16; G06T 15/506; G06T 2215/12
See application file for complete search history.

(56) References Cited

U.S. PATENT DOCUMENTS 8,542,231 B2 9/2013 Kaplanyan
9,613,431 B2 4/2017 Imber et al.
2011/0012901 A1* 1/2011 Kaplanyan ............ G06T 15/506 345/426
2016/0241837 A1* 8/2016 Cole .................... H04N 13/243
2018/0359488 A1* 12/2018 Cole .................... H04N 19/583
2020/0020151 A1* 1/2020 Lakshman ............ G06T 15/205
2020/0413094 A1* 12/2020 Lee ...................... H04N 19/167
2021/0099687 A1 4/2021 Shin et al.
2022/0345681 A1* 10/2022 Fleureau ................... G06T 9/00

FOREIGN PATENT DOCUMENTS

KR 10-2021-0069910 A 6/2021

OTHER PUBLICATIONS

Ramamoorthi, Ravi, and Pat Hanrahan. "An efficient representation for irradiance environment maps." *Proceedings of the 28th annual conference on Computer graphics and interactive techniques*. 2001.

* cited by examiner

*Primary Examiner* — Terrell M Robinson
(74) *Attorney, Agent, or Firm* — NSIP Law

(57) ABSTRACT

A video encoding method according to the present disclosure includes classifying a plurality of view images into basic images and additional images, performing pruning on at least one of the plurality of view images on the basis of the classification result, generating an atlas based on the pruning results, and encoding the atlas and metadata for the atlas.

12 Claims, 15 Drawing Sheets

【FIG. 13】
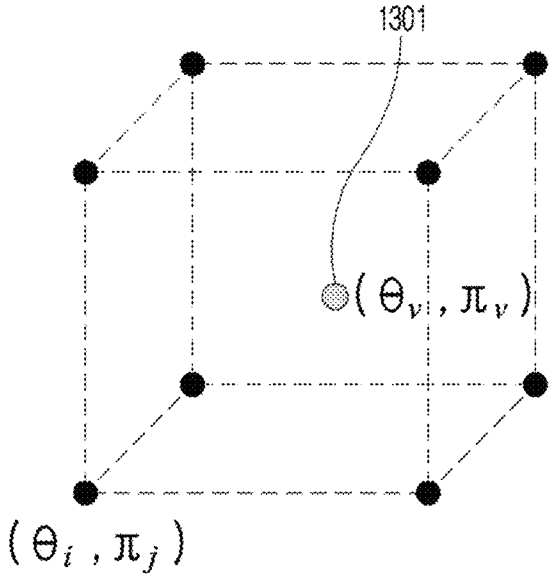

【FIG. 14】
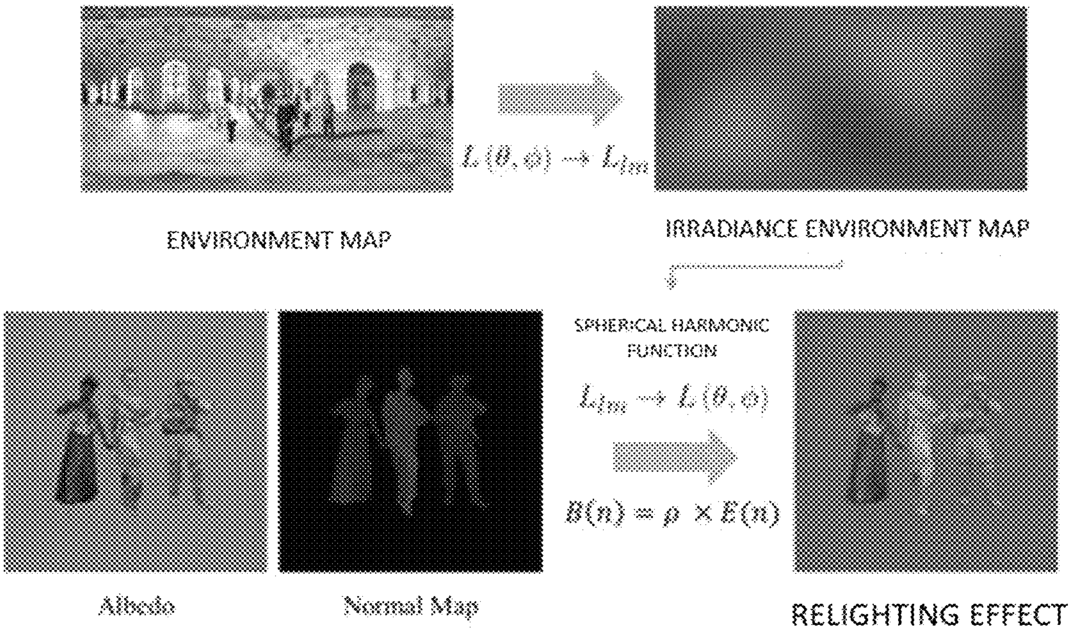

【FIG. 15】
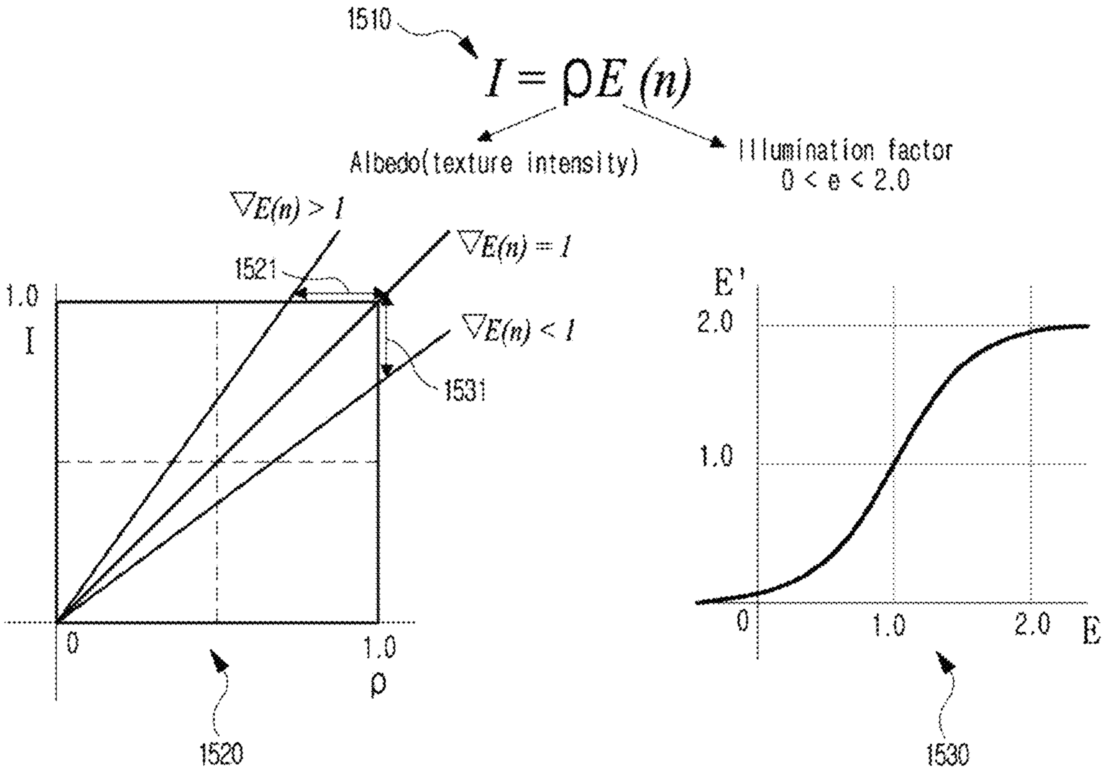

METHOD FOR DECODING IMMERSIVE VIDEO AND METHOD FOR ENCODING IMMERSIVE VIDEO

CROSS-REFERENCE TO RELATED APPLICATIONS

This application claims the benefit under 35 USC § 119(a) of Korean Patent Application No. 10-2022-0135209, filed on Oct. 19, 2022, Korean Patent Application No. 10-2023-0006952, filed on Jan. 17, 2023, Korean Patent Application No. 10-2023-0003708, filed on Jan. 10, 2023, and Korean Patent Application No. 10-2023-0003122, filed on Jan. 9,2023 in the Korean Intellectual Property Office, the entire disclosures of which are incorporated herein by reference for all purposes.

BACKGROUND OF THE INVENTION

Field of the Invention

The present disclosure relates to immersive video encoding/decoding methods for supporting motion parallax for rotational and translational movements.

Description of the Related Art

Virtual reality services are evolving to services for maximizing immersion and realism by generating omnidirectional images in the form of live action video or computer graphics (CG) and playing the same on HMDs, smartphones, etc. Currently, it is known that in order to play natural and immersive omnidirectional videos through HMDs, it is necessary support 6 degrees of freedom (DoF). 6 DoF images need to be provided as free images in six directions such as (1) left and right rotation, (2) up and down rotation, (3) left and right movement, and (4) up and down movement through an HMD screen. However, most omnidirectional images based on live action video only support rotational movement. Accordingly, research in areas such as acquisition and reproduction technology for 6 DoF omnidirectional images is being actively conducted.

SUMMARY OF THE INVENTION

Therefore, the present disclosure has been made in view of the above problems, and it is an object of the present disclosure to provide a method of encoding/decoding information on a spherical harmonic function that approximates an irradiance environment map.

It is an object of the present disclosure to apply a relighting effect to a heterogeneous object inserted into MIV content using a spherical harmonic function.

The technical objects to be achieved by the present disclosure are not limited to the technical objects mentioned above, and other technical objects not mentioned can be clearly understood by those skilled in the art from the description below.

A video encoding method according to the present disclosure includes classifying a plurality of view images into basic images and additional images, performing pruning on at least one of the plurality of view images on the basis of the classification result, generating an atlas based on the pruning results, and encoding the atlas and metadata for the atlas. Here, the metadata may include information on a spherical harmonic function for approximating an irradiance environment map at an arbitrary position in a three-dimensional space.

A video decoding method according to an embodiment of the present disclosure includes decoding an atlas and metadata for the atlas, and generating a viewport image using the atlas and the metadata. Here, the metadata may include information on a spherical harmonic function for approximating an irradiance environment map at an arbitrary position in a three-dimensional space.

In the video encoding/decoding methods according to an embodiment of the present invention, the information on the spherical harmonic function may include at least one of information indicating an order of the spherical harmonic function or information on coefficients for the spherical harmonic function.

In the video encoding/decoding methods according to an embodiment of the present invention, the information on the coefficients may be encoded separately for each channel of the atlas.

In the video encoding/decoding methods according to an embodiment of the present invention, the information on the spherical harmonic function may further include position information indicating a position corresponding to the irradiance environment map in the three-dimensional space.

In the video encoding/decoding methods according to an embodiment of the present invention, the information on the spherical harmonic function may include information indicating whether to reuse information on a spherical harmonic function used in a previous frame.

In the video encoding/decoding methods according to an embodiment of the present invention, the information on the spherical harmonic function may further include information on the coefficients for the spherical harmonic function if the information on the spherical harmonic function used in the previous frame is not reused.

In the video encoding/decoding methods according to an embodiment of the present invention, the metadata may further include resolution information of an environment map image used to obtain the irradiance environment map.

In the video encoding/decoding methods according to an embodiment of the present invention, the metadata may further include at least one of information indicating the type of a function used to apply a relighting effect to a heterogeneous object or information indicating coefficients of the function.

BRIEF DESCRIPTION OF THE DRAWINGS

FIG. 13 is a diagram for describing a 3D area in which coefficients of a spherical harmonic function are encoded.

FIG. 14 schematically illustrates a process of approximating an omnidirectional irradiance environment map with coefficients of a spherical harmonic function through a spherical harmonic function projection technique and a process of applying a relighting effect to a heterogeneous object.

FIG. 15 shows an example of linearly/nonlinearly reflecting an irradiance component on the texture surface of a target object at the time of applying a relighting effect to the target object using coefficients of a spherical harmonic function.

DETAILED DESCRIPTION OF THE INVENTION

Figure 1:
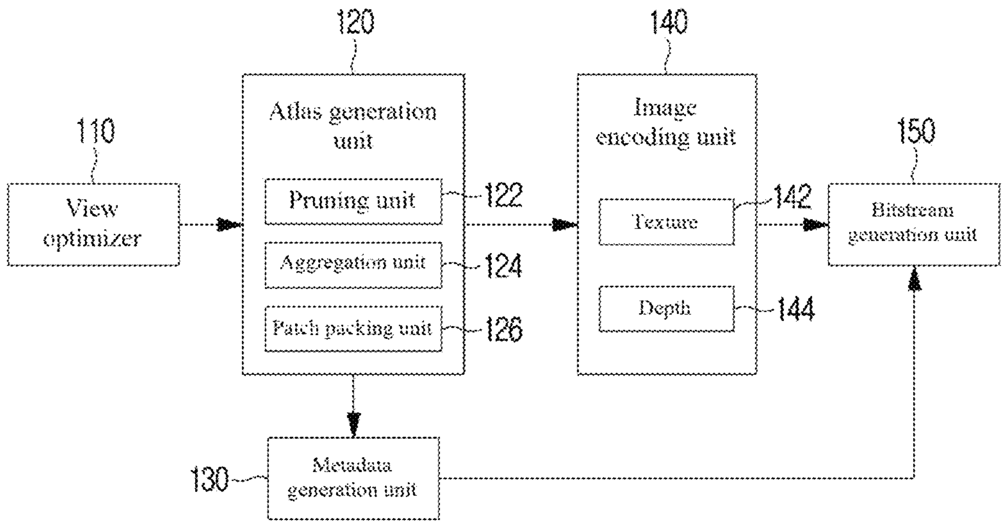
FIG. 1 is a block diagram of an immersive video processing device according to an embodiment of the present disclosure.

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being “connected” or “linked” to another element, it should be understood that it may be directly connected or linked to that another element, but there may be another element between them. Meanwhile, when an element is referred to as being “directly connected” or “directly linked” to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as “include” or “have”, etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of “including” a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

An immersive video, when a user’s viewing position is changed, refers to a video that a viewport image may be also dynamically changed. In order to implement an immersive video, a plurality of input images are required. Each of a plurality of input images may be referred to as a source image or a view image. A different view index may be assigned to each view image. An immersive image may be composed of images each of which has different view, thus, the immersive video can also be referred to as multi-view image.

An immersive video may be classified into 3 DoF (Degree of Freedom), 3 DoF+, Windowed-6 DoF or 6 DoF type, etc. A 3 DoF-based immersive video may be implemented by using only a texture image. On the other hand, in order to render an immersive video including depth information such as 3 DoF+ or 6 DoF, etc., a depth image (or, a depth map) as well as a texture image is also required.

It is assumed that embodiments described below are for immersive video processing including depth information such as 3 DoF+ and/or 6 DoF, etc. In addition, it is assumed that a view image is configured with a texture image and a depth image.

FIG. 1 is a block diagram of an immersive video processing device according to an embodiment of the present disclosure.

In reference to FIG. 1, an immersive video processing device according to the present disclosure may include a view optimizer 110, an atlas generation unit 120, a metadata generation unit 130, an image encoding unit 140 and a bitstream generation unit 150.

An immersive video processing device receives a plurality of pairs of images, a camera intrinsic parameters and a camera extrinsic parameter as an input data to encode an immersive video. Here, a plurality of pairs of images include a texture image (Attribute component) and a depth image (Geometry component). Each pair may have a different view. Accordingly, a pair of input images may be referred to as a view image. Each of view images may be divided by an index. In this case, an index assigned to each view image may be referred to as a view or a view index.

A camera intrinsic parameters includes a focal distance, a position of a principal point, etc. and a camera extrinsic parameters includes translations, rotations, etc. of a camera. A camera intrinsic parameters and a camera extrinsic parameters may be treated as a camera parameter or a view parameter.

A view optimizer 110 partitions view images into a plurality of groups. As view images are partitioned into a plurality of groups, independent encoding processing per each group may be performed. In an example, view images captured by N spatially consecutive cameras may be classified into one group. Thereby, view images that depth information is relatively coherent may be put in one group and accordingly, rendering quality may be improved.

In addition, by removing dependence of information between groups, a spatial random access service which performs rendering by selectively bringing only information in a region that a user is watching may be made available.

Whether view images will be partitioned into a plurality of groups may be optional.

In addition, a view optimizer 110 may classify view images into a basic image and an additional image. A basic image represents an image which is not pruned as a view image with a highest pruning priority and an additional image represents a view image with a pruning priority lower than a basic image.

A view optimizer 110 may determine at least one of view images as a basic image. A view image which is not selected as a basic image may be classified as an additional image.

A view optimizer 110 may determine a basic image by considering a view position of a view image. In an example, a view image whose view position is the center among a plurality of view images may be selected as a basic image.

Alternatively, a view optimizer 110 may select a basic image based on camera parameters. Specifically, a view optimizer 110 may select a basic image based on at least one of a camera index, a priority between cameras, a position of a camera or whether it is a camera in a region of interest.

In an example, at least one of a view image with a smallest camera index, a view image with a largest camera index, a view image with the same camera index as a predefined value, a view image captured by a camera with a highest priority, a view image captured by a camera with a lowest priority, a view image captured by a camera at a predefined position (e.g., a central position) or a view image captured by a camera in a region of interest may be determined as a basic image.

Alternatively, a view optimizer 110 may determine a basic image based on quality of view images. In an example, a view image with highest quality among view images may be determined as a basic image.

Alternatively, a view optimizer 110 may determine a basic image by considering an overlapping data rate of other view images after inspecting a degree of data redundancy between view images. In an example, a view image with a highest overlapping data rate with other view images or a view image with a lowest overlapping data rate with other view images may be determined as a basic image.

A plurality of view images may be also configured as a basic image.

An Atlas generation unit 120 performs pruning and generates a pruning mask. And, it extracts a patch by using a pruning mask and generates an atlas by combining a basic image and/or an extracted patch. When view images are partitioned into a plurality of groups, the process may be performed independently per each group.

A generated atlas may be composed of a texture atlas and a depth atlas. A texture atlas represents a basic texture image and/or an image that texture patches are combined and a depth atlas represents a basic depth image and/or an image that depth patches are combined.

An atlas generation unit 120 may include a pruning unit 122, an aggregation unit 124 and a patch packing unit 126.

A pruning unit 122 performs pruning for an additional image based on a pruning priority. Specifically, pruning for an additional image may be performed by using a reference image with a higher pruning priority than an additional image.

A reference image includes a basic image. In addition, according to a pruning priority of an additional image, a reference image may further include other additional image.

Whether an additional image may be used as a reference image may be selectively determined. In an example, when an additional image is configured not to be used as a reference image, only a basic image may be configured as a reference image.

On the other hand, when an additional image is configured to be used as a reference image, a basic image and other additional image with a higher pruning priority than an additional image may be configured as a reference image.

Through a pruning process, redundant data between an additional image and a reference image may be removed. Specifically, through a warping process based on a depth image, data overlapped with a reference image may be removed in an additional image. In an example, when a depth value between an additional image and a reference image is compared and that difference is equal to or less than a threshold value, it may be determined that a corresponding pixel is redundant data.

As a result of pruning, a pruning mask including information on whether each pixel in an additional image is valid or invalid may be generated. A pruning mask may be a binary image which represents whether each pixel in an additional image is valid or invalid. In an example, in a pruning mask, a pixel determined as overlapping data with a reference image may have a value of 0 and a pixel determined as non-overlapping data with a reference image may have a value of 1.

While a non-overlapping region may have a non-square shape, a patch is limited to a square shape. Accordingly, a patch may include an invalid region as well as a valid region. Here, a valid region refers to a region composed of non-overlapping pixels between an additional image and a reference image. In other words, a valid region represents a region that includes data which is included in an additional image, but is not included in a reference image. An invalid region refers to a region composed of overlapping pixels between an additional image and a reference image. A pixel/data included by a valid region may be referred to as a valid pixel/valid data and a pixel/data included by an invalid region may be referred to as an invalid pixel/invalid data.

An aggregation unit 124 combines a pruning mask generated in a frame unit in an intra-period unit.

In addition, an aggregation unit 124 may extract a patch from a combined pruning mask image through a clustering process. Specifically, a square region including valid data in a combined pruning mask image may be extracted as a patch. Regardless of a shape of a valid region, a patch is extracted in a square shape, so a patch extracted from a square valid region may include invalid data as well as valid data.

In this case, an aggregation unit 124 may repartition a L-shaped or C-shaped patch which reduces encoding efficiency. Here, a L-shaped patch represents that distribution of a valid region is L-shaped and a C-shaped patch represents that distribution of a valid region is C-shaped.

When distribution of a valid region is L-shaped or C-shaped, a region occupied by an invalid region in a patch is relatively large. Accordingly, a L-shaped or C-shaped patch may be partitioned into a plurality of patches to improve encoding efficiency.

For an unpruned view image, a whole view image may be treated as one patch. Specifically, a whole 2D image which develops an unpruned view image in a predetermined projection format may be treated as one patch. A projection format may include at least one of an Equirectangular Projection Format (ERP), a Cube-map or a Perspective Projection Format.

Here, an unpruned view image refers to a basic image with a highest pruning priority. Alternatively, an additional image that there is no overlapping data with a reference image and a basic image may be defined as an unpruned view image. Alternatively, regardless of whether there is overlapping data with a reference image, an additional image arbitrarily excluded from a pruning target may be also defined as an unpruned view image. In other words, even an additional image that there is data overlapping with a reference image may be defined as an unpruned view image.

A packing unit 126 packs a patch in a rectangle image. In patch packing, deformation such as size transform, rotation, or flip, etc. of a patch may be accompanied. An image that patches are packed may be defined as an atlas.

Specifically, a packing unit 126 may generate a texture atlas by packing a basic texture image and/or texture patches and may generate a depth atlas by packing a basic depth image and/or depth patches.

For a basic image, a whole basic image may be treated as one patch. In other words, a basic image may be packed in an atlas as it is. When a whole image is treated as one patch, a corresponding patch may be referred to as a complete image (complete view) or a complete patch.

The number of atlases generated by an atlas generation unit 120 may be determined based on at least one of an arrangement structure of a camera rig, accuracy of a depth map or the number of view images.

A metadata generation unit 130 generates metadata for image synthesis. Metadata may include at least one of camera-related data, pruning-related data, atlas-related data or patch-related data.

Pruning-related data includes information for determining a pruning priority between view images. In an example, at least one of a flag representing whether a view image is a root node or a flag representing whether a view image is a leaf node may be encoded. A root node represents a view image with a highest pruning priority (i.e., a basic image) and a leaf node represents a view image with a lowest pruning priority.

When a view image is not a root node, a parent node index may be additionally encoded. A parent node index may represent an image index of a view image, a parent node.

Alternatively, when a view image is not a leaf node, a child node index may be additionally encoded. A child node index may represent an image index of a view image, a child node.

Atlas-related data may include at least one of size information of an atlas, number information of an atlas, priority information between atlases or a flag representing whether an atlas includes a complete image. A size of an atlas may include at least one of size information of a texture atlas and size information of a depth atlas. In this case, a flag representing whether a size of a depth atlas is the same as that of a texture atlas may be additionally encoded. When a size of a depth atlas is different from that of a texture atlas, reduction ratio information of a depth atlas (e.g., scaling-related information) may be additionally encoded. Atlas-related information may be included in a "View parameters list" item in a bitstream.

In an example, geometry_scale_enabled_flag, a syntax representing whether it is allowed to reduce a depth atlas, may be encoded/decoded. When a value of a syntax geometry_scale_enabled_flag is 0, it represents that it is not allowed to reduce a depth atlas. In this case, a depth atlas has the same size as a texture atlas.

When a value of a syntax geometry_scale_enabled_flag is 1, it represents that it is allowed to reduce a depth atlas. In this case, information for determining a reduction ratio of a depth atlas may be additionally encoded/decoded. In an example, geometry_scaling_factor_x, a syntax representing a horizontal directional reduction ratio of a depth atlas, and geometry_scaling_factor_y, a syntax representing a vertical directional reduction ratio of a depth atlas, may be additionally encoded/decoded.

An immersive video output device may restore a reduced depth atlas to its original size after decoding information on a reduction ratio of a depth atlas.

Patch-related data includes information for specifying a position and/or a size of a patch in an atlas image, a view image to which a patch belongs and a position and/or a size of a patch in a view image. In an example, at least one of position information representing a position of a patch in an atlas image or size information representing a size of a patch in an atlas image may be encoded. In addition, a source index for identifying a view image from which a patch is derived may be encoded. A source index represents an index of a view image, an original source of a patch. In addition, position information representing a position corresponding to a patch in a view image or position information representing a size corresponding to a patch in a view image may be encoded. Patch-related information may be included in an "Atlas data" item in a bitstream.

An image encoding unit 140 encodes an atlas. When view images are classified into a plurality of groups, an atlas may be generated per group. Accordingly, image encoding may be performed independently per group.

An image encoding unit 140 may include a texture image encoding unit 142 encoding a texture atlas and a depth image encoding unit 144 encoding a depth atlas.

A bitstream generation unit 150 generates a bitstream based on encoded image data and metadata. A generated bitstream may be transmitted to an immersive video output device.

Figure 2:
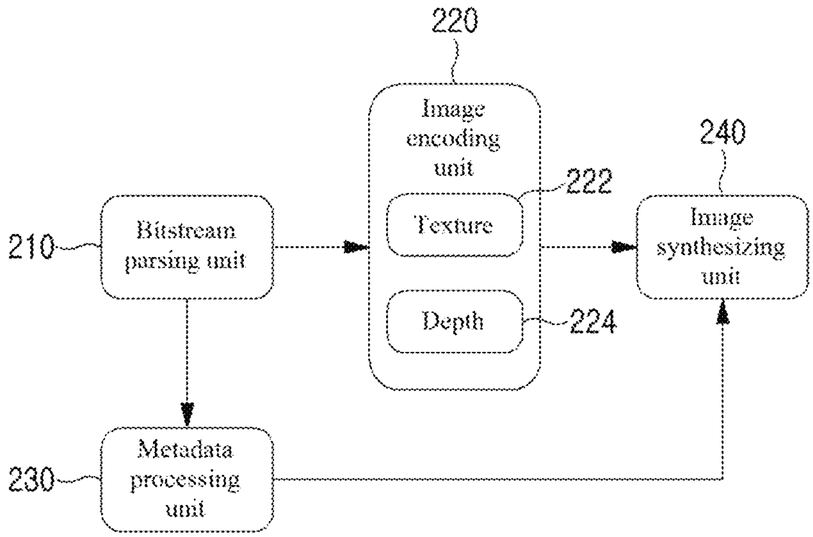
FIG. 2 is a block diagram of an immersive video output device according to an embodiment of the present disclosure.

FIG. 2 is a block diagram of an immersive video output device according to an embodiment of the present disclosure.

In reference to FIG. 2, an immersive video output device according to the present disclosure may include a bitstream parsing unit 210, an image decoding unit 220, a metadata processing unit 230 and an image synthesizing unit 240.

A bitstream parsing unit 210 parses image data and metadata from a bitstream. Image data may include data of an encoded atlas. When a spatial random access service is supported, only a partial bitstream including a watching position of a user may be received.

An image decoding unit 220 decodes parsed image data. An image decoding unit 220 may include a texture image decoding unit 222 for decoding a texture atlas and a depth image decoding unit 224 for decoding a depth atlas.

A metadata processing unit 230 unformats parsed metadata.

Unformatted metadata may be used to synthesize a specific view image. In an example, when motion information of a user is input to an immersive video output device, a metadata processing unit 230 may determine an atlas necessary for image synthesis and patches necessary for image synthesis and/or a position/a size of the patches in an atlas and others to reproduce a viewport image according to a user's motion.

An image synthesizing unit 240 may dynamically synthesize a viewport image according to a user's motion. Specifically, an image synthesizing unit 240 may extract patches required to synthesize a viewport image from an atlas by using information determined in a metadata processing unit 230 according to a user's motion. Specifically, a viewport image may be generated by extracting patches extracted from an atlas including information of a view image required to synthesize a viewport image and the view image in the atlas and synthesizing extracted patches.

Figure 3:
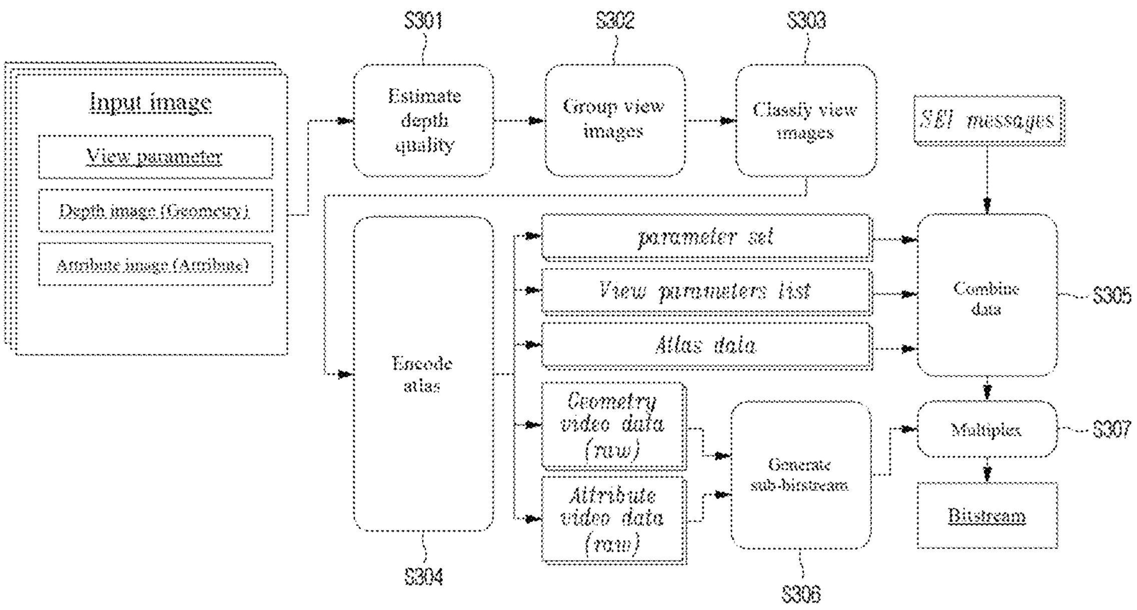
FIG. 3 is a flow chart of an immersive video processing method.
Figure 5:
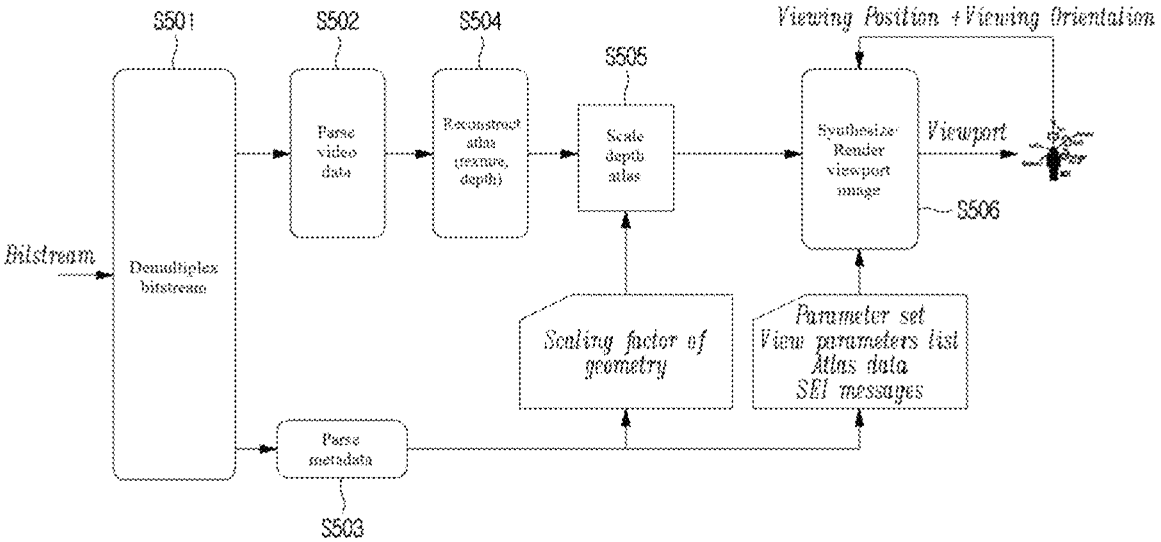
FIG. 5 is a flow chart of an immersive video output method.

FIGS. 3 and 5 show a flow chart of an immersive video processing method and an immersive video output method, respectively.

In the following flow charts, what is italicized or underlined represents input or output data for performing each step. In addition, in the following flow charts, an arrow represents processing order of each step. In this case, steps without an arrow indicate that temporal order between corresponding steps is not determined or that corresponding steps may be processed in parallel. In addition, it is also possible to process or output an immersive video in order different from that shown in the following flow charts.

An immersive video processing device may receive at least one of a plurality of input images, a camera internal variable and a camera external variable and evaluate depth map quality through input data S301. Here, an input image may be configured with a pair of a texture image (Attribute component) and a depth image (Geometry component).

An immersive video processing device may classify input images into a plurality of groups based on positional proximity of a plurality of cameras S302. By classifying input images into a plurality of groups, pruning and encoding may be performed independently between adjacent cameras whose depth value is relatively coherent. In addition, through the process, a spatial random access service that rendering is performed by using only information of a region a user is watching may be enabled.

But, the above-described S301 and S302 are just an optional procedure and this process is not necessarily performed.

When input images are classified into a plurality of groups, procedures which will be described below may be performed independently per group.

An immersive video processing device may determine a pruning priority of view images S303. Specifically, view images may be classified into a basic image and an additional image and a pruning priority between additional images may be configured.

Figure 4:
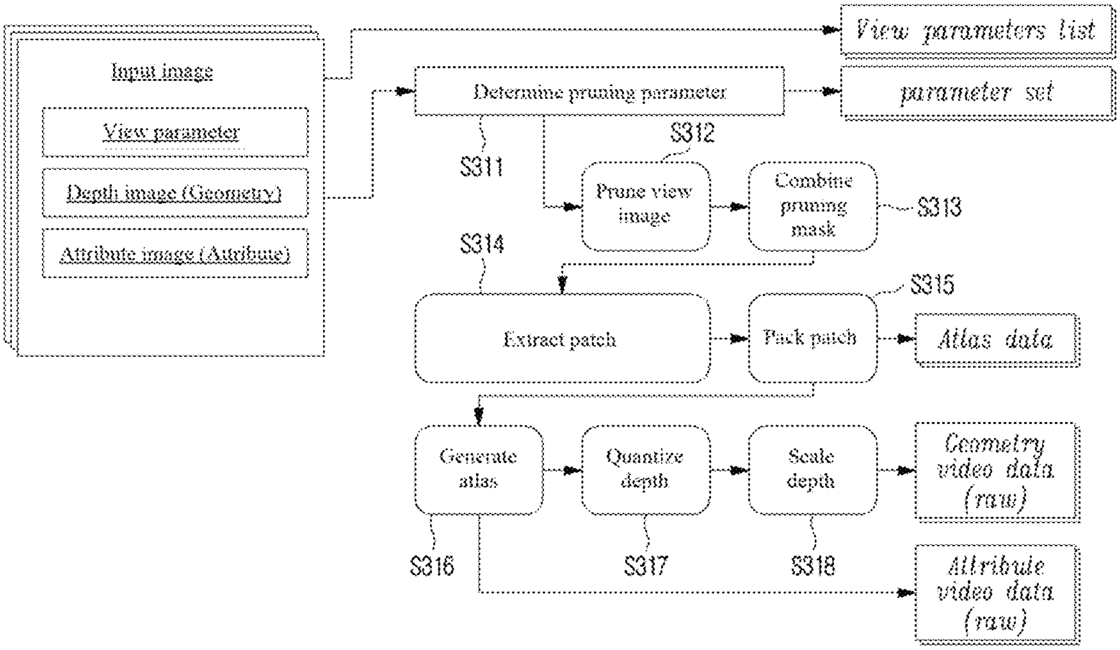
FIG. 4 is a flow chart of an atlas encoding process.

Subsequently, based on a pruning priority, an atlas may be generated and a generated atlas may be encoded S304. A process of encoding atlases is shown in detail in FIG. 4.

Specifically, a pruning parameter (e.g., a pruning priority, etc.) may be determined S311 and based on a determined pruning parameter, pruning may be performed for view images S312. As a result of pruning, a basic image with a highest priority is maintained as it is originally. On the other hand, through pruning for an additional image, overlapping data between an additional image and a reference image is removed. Through a warping process based on a depth image, overlapping data between an additional image and a reference image may be removed.

As a result of pruning, a pruning mask may be generated. If a pruning mask is generated, a pruning mask is combined in a unit of an intra-period S313. And, a patch may be extracted from a texture image and a depth image by using a combined pruning mask S314. Specifically, a combined pruning mask may be masked to texture images and depth images to extract a patch.

In this case, for an non-pruned view image (e.g., a basic image), a whole view image may be treated as one patch.

Subsequently, extracted patches may be packed S315 and an atlas may be generated S316. Specifically, a texture atlas and a depth atlas may be generated.

In addition, an immersive video processing device may determine a threshold value for determining whether a pixel is valid or invalid based on a depth atlas S317. In an example, a pixel that a value in an atlas is smaller than a threshold value may correspond to an invalid pixel and a pixel that a value is equal to or greater than a threshold value may correspond to a valid pixel. A threshold value may be determined in a unit of an image or may be determined in a unit of a patch.

For reducing the amount of data, a size of a depth atlas may be reduced by a specific ratio S318. When a size of a depth atlas is reduced, information on a reduction ratio of a depth atlas (e.g., a scaling factor) may be encoded. In an immersive video output device, a reduced depth atlas may be restored to its original size through a scaling factor and a size of a texture atlas.

Metadata generated in an atlas encoding process (e.g., a parameter set, a view parameter list or atlas data, etc.) and SEI (Supplemental Enhancement Information) are combined S305. In addition, a sub bitstream may be generated by encoding a texture atlas and a depth atlas respectively S306. And, a single bitstream may be generated by multiplexing encoded metadata and an encoded atlas S307.

An immersive video output device demultiplexes a bitstream received from an immersive video processing device S501. As a result, video data, i.e., atlas data and metadata may be extracted respectively S502 and S503.

An immersive video output device may restore an atlas based on parsed video data S504. In this case, when a depth atlas is reduced at a specific ratio, a depth atlas may be scaled to its original size by acquiring related information from metadata S505.

When a user's motion occurs, based on metadata, an atlas required to synthesize a viewport image according to a user's motion may be determined and patches included in the atlas may be extracted. A viewport image may be generated and rendered S506. In this case, in order to synthesize viewpoint image with the patches, size/position information of each patch and a camera parameter, etc. may be used.

Figure 6:
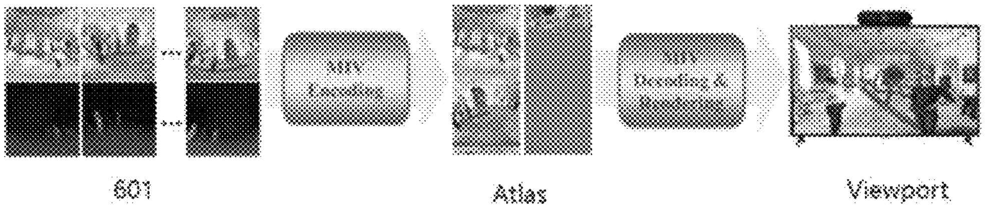
FIG. 6 is a diagram illustrating a main process for immersive video encoding/decoding.

FIG. 6 is a diagram illustrating a main process for immersive video encoding/decoding on the basis of the above description.

Reference numeral 601 denotes view images obtained from multiple cameras. Each of the view images may be composed of a texture image and a geometric image.

Any view image desired by a user can be synthesized and reproduced using view images and camera calibration information. Here, the camera calibration information may include a view image or 3D geometric information on a camera that has captured the view image.

As the number of input view images increases, immersiveness regarding a reproduced image is improved. However, as the number of input view images increases, the amount of data that needs to be encoded/decoded and transmitted increases, which may cause problems in real-time data processing services (e.g., streaming services via broadcast networks or IP networks).

Accordingly, in order to reduce the amount of data that needs to be encoded/decoded and transmitted, pruning can be performed to remove overlapping pixels between view images.

Figure 7:
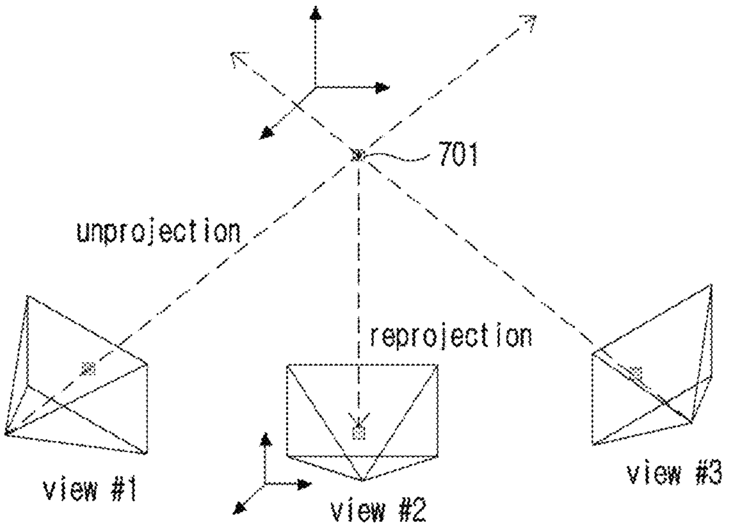
FIG. 7 illustrates overlapping pixels.

FIG. 7 illustrates overlapping pixels.

Among overlapping pixels between view images, only one representative pixel can be left and the remaining pixels can be removed. For example, in the example shown in FIG. 7, the point 701 indicated on a three-dimensional space represents a position commonly projected from three view images view #1, view #2, and view #3.

Pixels projected to the position 701 from the three view images have the same or similar values.

Using the above relationship, after warping a reference view image to another view, pixels at the same position are compared, and if a difference is within a threshold value, the pixels at the same position can be determined to be overlapping pixels. Redundancy between view images can be removed by removing at least one of the pixels determined to be overlapping pixels.

In a case in which the pruning process is performed, as described above, overlapping pixels are removed and only a representative pixel remains. A preserved pixel or set of pixels may be patched into a rectangular shape, and patches may be packed into an atlas image. The above process can also be called patch packing.

Meanwhile, metadata for restoring lost or converted information may be additionally encoded/decoded in a decoder through pruning and patch packing.

The decoder may restore an image using the aforementioned metadata and synthesize/reproduce an image for an arbitrary view from the restored image.

An immersive video encoded/decoded through the procedure described with reference to FIG. 6 may be referred to as a first type video, an MPEG immersive video (MIV), or a general video.

Meanwhile, it is also possible to reproduce an image for a target view by inserting a heterogeneous object along with an MIV. Here, a heterogeneous object may be partial image data input or transmitted through a heterogeneous medium generated by other methods such as CG and a computer vision-based object extraction technique, separately from a reference view image acquisition process. Additionally, a heterogeneous object may be restored from a type of image for which pruning or patch packing considering a geometric relationship between view images is not performed. As an example, a heterogeneous object may be restored from a point cloud or mesh type image.

Figure 8:
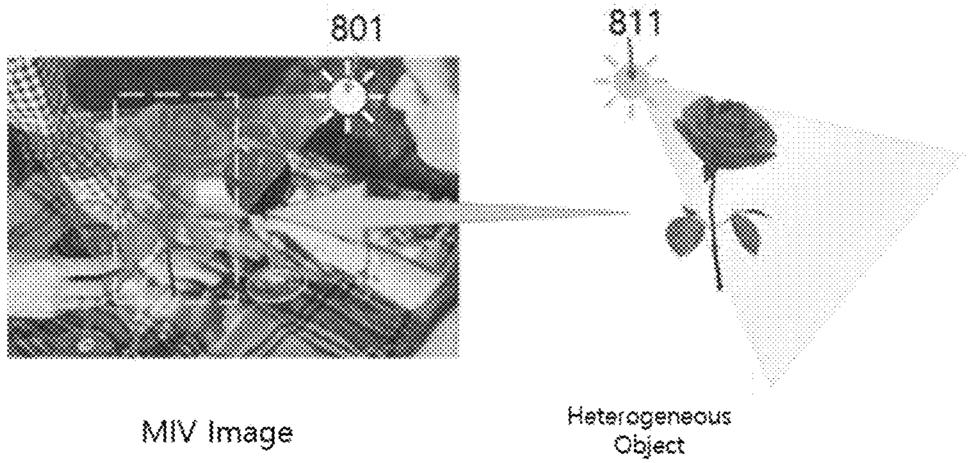
FIG. 8 illustrates an image reproduced by inserting a heterogeneous object into an MIV image.

FIG. 8 illustrates an image reproduced by inserting a heterogeneous object into an MIV image.

An MIV image and a heterogeneous object are created in independent environments. For example, in the example shown in FIG. 8, the MIV image has been captured in an illumination environment in which light is incident in a first direction 801, whereas the heterogeneous object has been captured in an illumination environment in which light is incident in a second direction 811.

Accordingly, for natural rendering, it is necessary to be able to process the heterogeneous object by considering global illumination or radiosity in the MIV image.

That is, in order to insert the heterogeneous object into a target scene, it is necessary to reflect at least one of global illumination and irradiance of the target scene.

However, estimating a global illumination component in a live-action scene is very complicated and requires a long calculation time, making it difficult to naturally insert a heterogeneous object in streaming-based real-time reproduction services.

Meanwhile, light emitted from a light source (e.g., the sun or the like) may previously be reflected from the surface of an object and reach the eyes. Light incident from a light source is called direct illumination, and light that is not directly radiated from a light source but is incident by being reflected from the surface of an object is called indirect illumination. Illumination estimation in a live-action scene is very complicated because it is necessary to separate/track direct and indirect illumination components for at least one light source.

However, it is possible to approximate diffuse reflection in which light is reflected in a hemispherical shape from the surface of an object before reaching the eyes.

Figure 9:
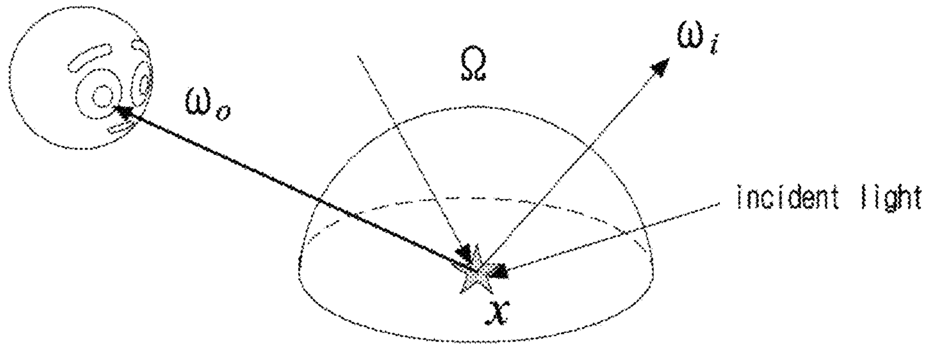
FIG. 9 shows an example of approximating diffuse reflection.

FIG. 9 shows an example of this.

FIG. 9 illustrates radiance according to emission of irradiance around one vertex x in an opposite direction due to diffuse reflection.

As a method of estimating an illumination distribution in a situation in which hemispherical diffuse reflection shown in FIG. 9 is applied, a method using an environment map may be conceived. Here, the environment map represents incident light incident on one vertex in a three-dimensional space as a sphere.

As an example, the illumination distribution in a situation of diffuse reflection around a vertex x in FIG. 9 can be represented in the form of an integral equation, as represented by Equation 1 below.

$$E(n)=\int L(\omega)(n\cdot)d\omega \qquad \text{[Equation 1]}$$

In Equation 1, L represents a distant illumination component incident on the vertex x in a direction ω, which indicates a distant lighting distribution at the vertex x. n represents a normal vector of the surface of the sphere, and w represents a direction vector incident on the surface of the sphere.

In a case in which a heterogeneous object is inserted at an arbitrary position in a target scene, irradiance at the position can be estimated to reproduce radiosity with respect to the surface of the heterogeneous object. Specifically, the radiosity can be derived using the irradiance derived based on Equation 1 and albedo of the object surface. Equation 2 represents an example of deriving radiosity.

$$B(n)=\rho\times E(n) \quad \text{[Equation 2]}$$

In Equation 2, ρ represents albedo of the object surface.

Irradiance represents the total amount of light incident on the surface of an object. Irradiance includes not only direct light but also diffuse light. As an example of measuring irradiance, a photo taken from the front of a mirror ball that can reflect light coming from all directions of 180 degrees or 360 degrees can be used.

Figure 10:
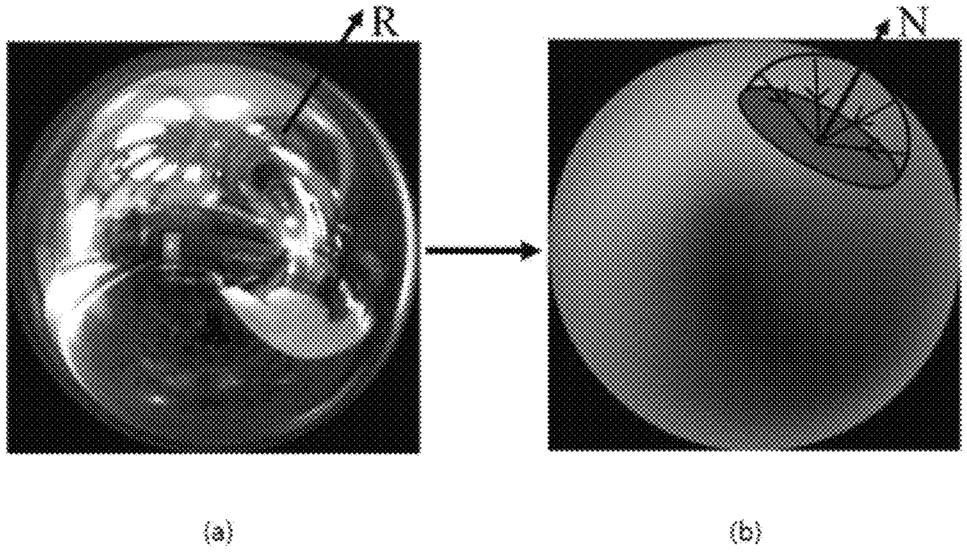
FIG. 10 shows an example of measuring irradiance on the basis of a photo of a mirror ball.

FIG. 10 shows an example of measuring irradiance based on a photo of a mirror ball.

FIG. 10(*a*) shows an illumination environment map image in which incident light is recorded through a mirror ball. An illumination environment map is an element corresponding to the value L of an incident illumination component in Equation 1.

FIG. 10(*b*) is an irradiance environment map and shows irradiance E derived through the integral equation of Equation 1.

In the case of inserting a heterogeneous object at a target position in a target scene, in order to apply a relighting effect to the heterogeneous object, a step of acquiring an illumination component value based on the illumination environment map shown in FIG. 10(*a*) and a step of acquiring irradiance based on the irradiance environment map shown in FIG. 10(*b*) may be performed.

Specifically, an illumination component value with respect to the target position at which the heterogeneous object is to be inserted can be obtained. Irradiance can be obtained on the basis of the illumination component value, and the relighting effect can be applied to the texture component on the surface of the heterogeneous object in consideration of the obtained irradiance and the albedo of the surface of the heterogeneous object.

However, if the aforementioned process is added to the process of synthesizing a virtual view image in real time, a problem that the number of calculations required for image rendering significantly increases may occur. Accordingly, in deriving irradiance and radiosity, a method of approximating the process of deriving radiosity using a spherical harmonic function may be considered.

Equation 3 represents a spherical harmonic function $Y_{l,m}$.

$$Y_{l,m}(\theta,\phi)=\begin{cases} c_{l,m}P_l^{|m|}(\cos\theta)\sin(|m|\phi) & -l\le m\le 0 \\ \frac{c_{l,m}}{\sqrt{2}}P_l^0(\cos\theta) & m=0 \\ c_{l,m},\ P_l^m(\cos\theta)\cos(m\phi) & 0\le m\le l \end{cases} \quad \text{[Equation 3]}$$

Equation 3 is an equation for approximating brightness in each direction toward the center of a sphere for a vertex in an arbitrary three-dimensional space in a spherical coordinate system. When there is a straight line p diverging from the center of a sphere in a specific direction in the spherical coordinate system, θ represents the angle from the positive direction of the z-axis to the straight line formed by the origin and the straight line p. ϕ represents the angle from the positive direction of the x-axis to the straight line formed by projecting the straight line formed by the origin and straight line p projected onto the xy plane.

The spherical harmonic function is continuous, and thus l has a non-negative integer value. Additionally, m is an integer that satisfies $-l\le m\le l$.

In Equation 3, $P_l^m$ represents Legendre Polynomials. Further, in Equation 3, $c_{l,m}$ can be derived as represented by Equation 4 below.

$$c_{l,m}=\sqrt{\frac{2l+1}{2\pi}\frac{(l+|m|!)}{(l+|m|!)}} \quad \text{[Equation 4]}$$

Let $\tilde{f}$ be a spherical harmonic function for approximating distribution of reflected light components at a spherical target reference point. In this case, the spherical harmonic function $\tilde{f}$ at the target reference point can be represented as the weighted sum of spherical harmonic functions $Y_{l,m}$, as represented by Equation 5 below. Here, each of the spherical harmonic functions serving as the basis of the function $\tilde{f}$ can be called a basis function.

$$\tilde{f}(\theta,\phi)=\sum_{l,m}c_{lm}Y_{lm}(\theta,\phi) \quad \text{[Equation 5]}$$

Figure 11:
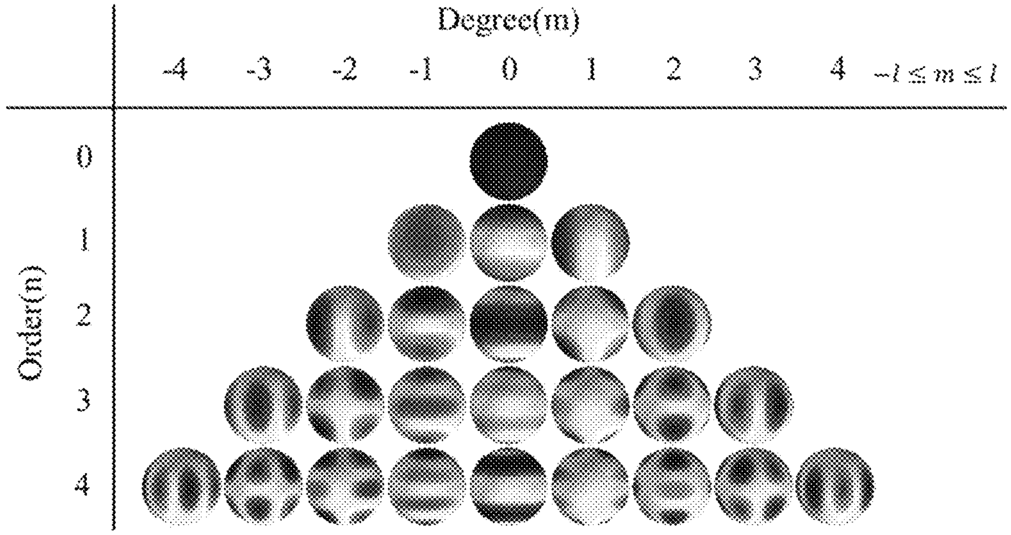
FIG. 11 shows an information distribution chart according to the order and degree of freedom of a spherical harmonic function.

FIG. 11 shows an information distribution chart according to the order and degree of freedom of a spherical harmonic function.

As in the example shown in FIG. 11, in a case in which the order of the spherical harmonic function increases from N to (N+1), the number of basis functions required to approximate a target spherical harmonic function increases by (2(N+1)+1). For example, when the order of the spherical harmonic function is 0, the spherical harmonic function can be approximated using only a basis function in one direction. On the other hand, when the order of the spherical harmonic function is 1, basis functions in three directions (i.e., three basis functions) are additionally required to approximate the spherical harmonic function. That is, when the order of the spherical harmonic function is 1, a total of four basis functions is required to approximate the spherical harmonic function. Likewise, when the order of the spherical harmonic function is 2, basis functions in five directions are additionally required, and accordingly, the spherical harmonic function can be approximated using a total of 9 basis functions. When the order of the spherical harmonic function is 3, a total of 16 basis functions can be used, and when the order of the spherical harmonic function is 4, a total of 25 basis functions can be used.

That is, as the degree of the spherical harmonic function increases, the amount of information that can be represented in a local area of the spherical coordinate system increases, and accordingly, expressiveness for high-frequency components can increase.

Meanwhile, the present disclosure provides a method of encoding and signaling an irradiance environment map representing irradiance components required for relighting a heterogeneous object as metadata. Specifically, the present disclosure provides a method of approximating an irradiance environment map for an arbitrary position in a three-dimensional space through a spherical harmonic function, encoding information of the spherical harmonic function used in this process, specifically, coefficients of the spherical harmonic function, and signaling the encoding result.

As described above, the spherical harmonic function at the target reference point is composed of orthogonal basis functions for each orientation based on the spherical coordinate system. Each of the orthogonal basis functions defined based on the spherical surface can be represented as the sum of spherical harmonic functions. In Equation 1, L and E can be represented as (θ, ϕ) which is direction information in the spherical coordinate system. Specifically, L(θ, ϕ) can be represented as Equation 6 below through expansion into a spherical harmonic function.

$$L_{lm} = \int_{\theta=0}^{\pi}\int_{\phi=0}^{2\pi} L(\theta, \phi)Y_{lm}(\theta, \phi)\sin\theta d\theta d\phi \qquad \text{[Equation 6]}$$

In Equation 6, $Y_{l,m}$ represents a spherical harmonic function.

An irradiance environment map can be represented using a spherical harmonic function defined by as many coefficients as the number of basis functions used to represent the spherical harmonic function at the target reference point. For example, if the order of the spherical harmonic function at the target reference point is 2, the irradiance environment map can be represented using 9 coefficients for each channel. For example, if the irradiance environment map is composed of three channels of YUV, the irradiance environment map can be represented using 27 coefficients. This means that irradiance information in the form of a hemisphere or sphere can be represented with 27 coefficients.

Next, when an illumination component $L_{lm}$ is obtained through the illumination environment map, irradiance E can be obtained according to Equation 7 below.

$$E(\theta, \phi) = \sum_{l,m} \hat{A}_l L_{lm} Y_{lm}(\theta, \phi) \qquad \text{[Equation 7]}$$

The irradiance derived through Equation 7 represents the irradiance value having the target position within the target scene as a center. In a case in which a heterogeneous object is inserted into the target position, the relighting effect can be applied to the heterogeneous object within the target scene using the irradiance derived through Equation 7. The relighting effect for the heterogeneous object can be implemented according to Equation 2 using the albedo of the object surface.

Figure 12:
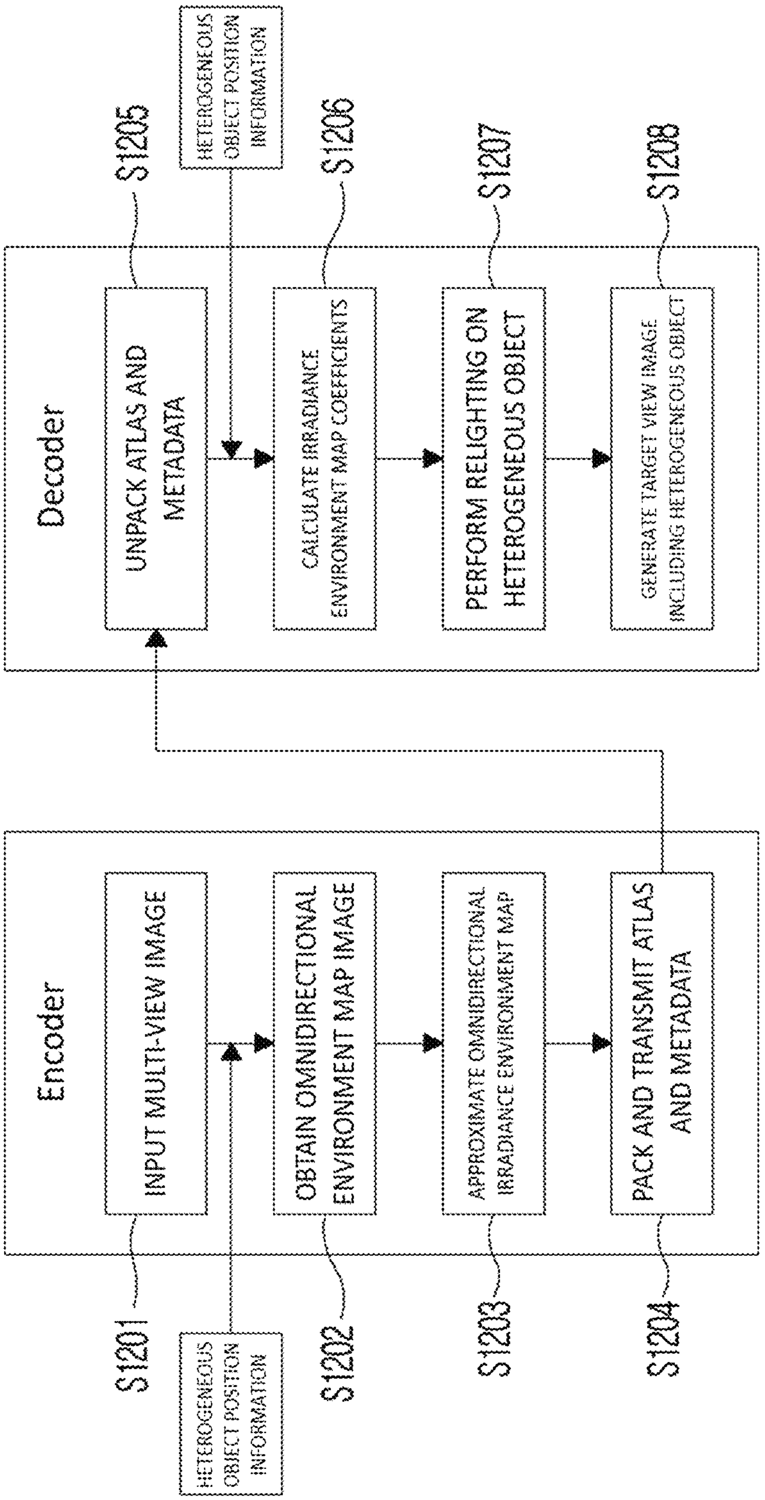
FIG. 12 shows operations of an encoder and a decoder for applying a relighting effect to a heterogeneous object.

FIG. 12 shows operations of an encoder and a decoder to apply the relighting effect to a heterogeneous object.

The encoder shown in FIG. 12 may correspond to or be included in the immersive video processing device of FIG. 1, and the decoder may correspond to or be included in the immersive video output device of FIG. 2.

When a multi-view image is input, the encoder obtains an omnidirectional environment map at a target position (S1201 and S1202). The omnidirectional environment map represents an illumination environment in a direction of 180 degrees to 360 degrees and may include an illumination environment map.

The target position for obtaining an omnidirectional environment map image may be predefined according to the intention of a content producer or director.

Depending on the type of content, an omnidirectional environment map can be created using various methods. For example, if the content is of a computer graphics (CG) type, a perfect 360-degree omnidirectional environment map image can be rendered and obtained in advance in a CG content production stage. In the case of live-action content, an omnidirectional environmental map can be obtained using a separate auxiliary device such as a fisheye camera or a mirror ball. However, if an already given image is an image that does not contain 360-degree omnidirectional information, such as a multi-view image obtained using a perspective method, an omnidirectional environment map may be generated using deep learning-based image processing technology.

When the omnidirectional environment map is obtained, an omnidirectional irradiance environment map may be approximated using a spherical harmonic function using at least one coefficient through a spherical harmonic function projection technique (S1203).

Information on the spherical harmonic function for approximating the omnidirectional irradiance environment map may be encoded into metadata (S1204). Here, the information on the spherical harmonic function may include information on coefficients of the spherical harmonic function that approximates the omnidirectional irradiance environment map.

The encoded metadata may be transmitted to the decoder as a bitstream along with an encoded atlas.

The decoder decodes/unpacks the atlas and metadata received from the encoder (S1205). Additionally, a preprocessing process may be performed to synthesize an image for a target view.

When a position of a heterogeneous object to be inserted at the target view is determined, it is determined whether the position corresponding to the irradiance environment map included in the metadata matches the target position where the heterogeneous object is to be inserted.

Specifically, while the information on the spherical harmonic function transmitted as metadata represents the coefficients of the spherical harmonic function that approximates an irradiance component at predefined coordinates, the heterogeneous object may be inserted at a position different from the position corresponding to the irradiance component through a content producer or user input in an actual user terminal. In this case, the coefficients of the spherical harmonic function with respect to the position where the heterogeneous object is to be inserted, that is, the target position, can be derived by referring to the decoded coefficients of the spherical harmonic function. Specifically, the coefficients of the spherical harmonic function with respect to the target position can be derived through interpolation based on tri-linear interpolation for the coefficients of the spherical harmonic function.

On the other hand, if the position corresponding to the irradiance component matches the target position where the heterogeneous object is to be inserted, the decoded coefficients of the spherical harmonic function can be used as they are.

When the coefficients of the spherical harmonic function used to approximate the irradiance environment map at the target position are derived, a relighting effect can be applied to the heterogeneous object to generate a target view image with the heterogeneous object inserted thereinto (S1207 and S1208)

In encoding information on the spherical harmonic function, only one arbitrary point within the multi-view image may be targeted.

By extending this, an arbitrary three-dimensional area is set in the multi-view image, and then the information on the spherical harmonic function may be encoded for each of a plurality of vertices (i.e., plural positions) used to define the area.

FIG. 13 is a diagram for describing a three-dimensional area in which coefficients of a spherical harmonic function are encoded.

As in the example shown in FIG. 13, a hexahedral grid can be defined with eight vertices. For the position of each of the eight vertices used to define the grid, the information on the spherical harmonic function can be encoded.

In this case, when movement of a heterogeneous object occurs within the three-dimensional area, coefficients of the spherical harmonic function at a position (e.g., 1301) according to the movement of the heterogeneous object may be estimated by interpolating the coefficients of the spherical harmonic function at adjacent positions.

In order to encode the coefficients of the spherical harmonic function for the three-dimensional area, a lookup table in which the coefficients of the spherical harmonic function and position information are mapped may be created. Then, the spherical harmonic function in the lookup table and position information mapped thereto can be encoded together. Here, the position information may be represented in the form of three-dimensional coordinates (x, y, z) according to a Cartesian coordinate system, or in the form of (θ, ϕ) set around specific coordinates according to a spherical coordinate system.

FIG. 14 schematically illustrates a process of approximating an omnidirectional irradiance environment map with coefficients of a spherical harmonic function through a spherical harmonic function projection technique and a process of applying the relighting effect to a heterogeneous object.

Radiosity B(n) for the heterogeneous object may be derived using an irradiance value E(n) calculated through spherical harmonic function coefficients, texture intensity (i.e., ρ (albedo)) of the surface of the target heterogeneous object, and a surface normal vector.

In order to apply the relighting effect to the heterogeneous object, information on spherical harmonic functions for approximating an irradiance environment map having a target position to be inserted into the heterogeneous object as a center needs to be included in metadata. Specifically, at least one of information indicating the number of spherical harmonic functions, information for identifying each of the spherical harmonic functions, information indicating the order of the spherical harmonic functions, information indicating the number of coefficients, or information indicating the value of each coefficient may be encoded/decoded as metadata.

Table 1 shows an example of a syntax structure including spherical harmonic function information.

TABLE 1

| | Descriptor |
|---|---|
| heterogenous__object__relighting parameters( payloadSize ){ | |
| horp__num__irradiance__map | u(6) |
| if(0 < horp__num__irradiance__map) { | |
| for( v=1; v<=horp__num__irradiance__map ; v++ ) { | |
| horp__irradiance__map__pos__x[v] | fl(32) |
| horp__irradiance__map__pos__y[v] | fl(32) |
| horp__irradiance__map__pos__z[v] | fl(32) |
| for( i=0; i <= 26 ; i++ ) | |
| horp__sh__coefficient[i] | fl(32) |
| } | |
| } | |
| } | |

In Table 1, the syntax horp_num_irradiance_map indicates the number of irradiance environment maps for a heterogeneous object inserted into a target scene. If the value of the syntax horp_num_irradiance_map is 0, this indicates that there is no heterogeneous object which will be relighted. In this case, there is no irradiance environment map. If the syntax horp_num_irradiance_map is greater than 0, information for restoring an irradiance environment map can be additionally decoded. Specifically, if the value of the syntax horp_num_irradiance_map is N, spherical harmonic function information for N positions can be additionally decoded.

The syntaxes horp_irradiance_map_pos_x[v], horp_irradiance_map_pos_y[v], and horp_irradiance_map_pos_z[v] indicate the coordinates of the x-axis, y-axis, and z-axis corresponding to a position where the target heterogeneous object will be inserted in the target scene, that is, an irradiance environment map. Each of the above syntaxes can be represented as 32 bit float or 16 bit float. Alternatively, information for identifying (θ, ϕ) coordinates may be encoded and signaled according to a spherical coordinate system.

The syntax horp_sh_coefficient[i] indicates coefficients of the spherical harmonic function at the position. Table 1 shows that the order of the spherical harmonic function is second order, and accordingly, 27 pieces of coefficient information for three channels (e.g., R, G, B or Y, U, V) are decoded. The number of coefficients to be encoded/decoded can be adaptively determined according to the order of the spherical harmonic function.

Information indicating the number of coefficients may be explicitly encoded/decoded. As an example, the syntax horp_num_sh_coefficients indicating the number of coefficients defining a spherical harmonic function can be explicitly encoded/decoded.

Table 1 shows that the syntax horp_sh_coefficient indicating the coefficients of the spherical harmonic function is integrally encoded/decoded for all channels. Unlike the example in Table 1, the syntax horp_sh_coefficient indicating the coefficients of the spherical harmonic function may be encoded/decoded separately for each channel.

For example, the syntax horp_sh_coefficient_R[i] indicating coefficients of a spherical harmonic function for an R channel, the syntax horp_sh_coefficient_G[i] indicating coefficients of a spherical harmonic function for a G channel, and the syntax horp_sh_coefficient_B[i] indicating coefficients of a spherical harmonic function for a B channel may be encoded and signaled.

Meanwhile, the number of channels in which the coefficients of the spherical harmonic function are encoded/decoded may be set variably. For this purpose, information indicating the number of channels in which the coefficients of the spherical harmonic function are encoded/decoded may be explicitly encoded/decoded. As an example, the syntax horp_num_channel_sh indicating the number of channels in which the coefficients of the spherical harmonic function are encoded/decoded may be explicitly encoded/decoded. In this case, the syntax horp_sh_coefficient indicating the coefficients of the spherical harmonic function may be encoded and signaled in the form of a two-dimensional array.

In Table 1, whether information for applying the relighting effect to the heterogeneous object is encoded/decoded is determined depending on whether the value of the syntax horp_num_irradiance_map indicating the number of irradiance environment maps is 0.

Alternatively, whether information for applying the relighting effect to an object is present in a bitstream may be indicated through information indicating whether applying the relighting effect to a heterogeneous object is allowed, for example, the syntax horp_enaggbled_flag. That is, it is possible to determine whether the metadata includes spherical harmonic function information using the 1-bit flag.

Table 2 below shows an example of expanding the syntax structure of Table 1.

TABLE 2

| | Descriptor |
|---|---|
| heterogenous_object_relighting parameters( payloadSize ){ | |
| horp_num_irradiance_maps | u(6) |
| if(0 < horp_num_irradiance_map) { | |
| horp_persistence_flag | u(1) |
| horp_num_irradiance_map_updates | u(6) |
| horp_irradiance_map_updates_flag[v] | ue(v) |
| for( v=0; v< horp_irradiance_map_updates ; v++ ) { | |
| horp_irradiance_map_pos_x[v] | fl(16) |
| horp_irradiance_map_pos_y[v] | fl(16) |
| horp_irradiance_map_pos_z[v] | fl(16) |
| for(c=0; c<3; c++) { | |
| for( i=0; i <9 ; i++ ) { | |
| horp_sh_coefficients[v][c][i] | fl(16) |
| } | |
| } | |
| } | |
| } | |
| } | |
| } | |

Table 2 shows an example in which the syntax horp_sh_coefficient[v][c][i] is encoded/decoded for each channel. This syntax can be encoded/decoded into 32 bit float or 16 bit float The syntax horp_persistence_flag indicates whether to continuously maintain heterogeneous object relighting parameters of a previous frame based on the current time axis. As an example, if the value of the syntax horp_persistence_flag is 0, this indicates that the heterogeneous object relighting parameters are applied only to the current atlas frame. On the other hand, if the value of the syntax horp_persistence_flag is 1, this indicates that the parameters of the previous frame can be maintained not only in the current atlas frame but also in frames whose decoding order is later than the current atlas frame. In this case, the heterogeneous object relighting parameters can be continuously maintained until at least one of a case in which a new sequence starts, a case in which a bitstream ends, or a case in which an atlas frame containing new heterogeneous object relighting parameters is transmitted is satisfied.

Meanwhile, an irradiance environment map used in the previous frame may be reused in the current frame. In a case in which a plurality of irradiance environment maps is present, an irradiance environment map used in the previous frame may be used as at least one of the plurality of irradiance environment maps, and information for irradiance environment map restoration may be encoded/decoded for the remaining irradiance environment maps. To this end, the syntax horp_num_irradiance_map_updates indicating whether an irradiance environment map is updated can be encoded/decoded. This syntax indicates the number of irradiance environment maps to be updated. The syntax may have a minimum value of 0 to a maximum value of horp_num_irradiance_maps. If the value of the syntax horp_num_irradiance_map_updates is 0, this indicates that irradiance environment maps used in the previous frame, that is, spherical harmonic functions, are applied to the current frame as they are.

If the syntax horp_num_irradiance_map_updates is greater than 0, the syntax horp_irradiance_map_updates_flag[v] indicating whether an irradiance environment map with index v is updated may be additionally encoded/decoded. If the syntax horp_irradiance_map_updates_flag[v] is 1, this indicates that information on the v-th irradiance environment map (specifically, coefficient of a spherical harmonic function) is updated. If the syntax horp_irradiance_map_updates_flag[v] is 0, this indicates that information on the v-th irradiance environment map is not updated. If the number of irradiance environment maps subject to update is equal to the total number of irradiance environment maps, encoding/decoding of the syntax horp_irradiance_map_updates_flag may be omitted and the value thereof may be inferred to be 1.

For an irradiance environment map for which the value of the syntax horp_irradiance_flag is 1, the syntax horp_sh_coefficient indicating the coefficients of the spherical harmonic function can be additionally encoded/decoded. In Table 2, the syntax horp_sh_coefficient[v][c][i] indicates the v-th irradiance environment map, the c-th channel, and coefficients of the i-th spherical harmonic function. If the order of the spherical harmonic function is second order, 9 horp_sh_coefficients can be encoded/decoded per channel.

Table 3 shows an example of expanding the syntax structure of Table 2.

TABLE 3

| | Descriptor |
|---|---|
| heterogenous_object_relighting parameters( payloadSize ){ | |
| horp_num_irradiance_maps | u(6) |
| if(0 < horp_num_irradiance_maps) { | |
| horp_persistence_flag | u(1) |
| horp_num_irradiance_map_updates | u(6) |
| horp_num_sh_coefficients | u(6) |
| for( v=0; v< horp_irradiance_map_updates ; v++ ) { | |
| k = horp_irradiance_map_idx[ v ] | ue(v) |
| horp_irradiance_map_pos_x[ k ] | fl(16) |
| horp_irradiance_map_pos_y[ k ] | fl(16) |
| horp_irradiance_map_pos_z[ k ] | fl(16) |
| for(c=0; c<3; c++) { | |
| for( i=0; i < horp_num_sh_coefficients ; i++ ) { | |
| horp_sh_coefficients[ k ][ c ][ i ] | fl(16) |
| } | |
| } | |
| } | |
| } | |
| } | |
| } | |

Table 3 shows an example of encoding/decoding the syntax horp_irradiance_map_idx[v] indicating the index of an irradiance environment map that needs to be updated instead of indicating whether each of required irradiance environments is to be updated using a flag. The syntax horp_irradiance_map_idx can be encoded/decoded by the number of irradiance environment maps to be updated (i.e., the value of the syntax horp_num_irradiance_map_updates).

FIG. 15 shows an example of linearly/nonlinearly reflecting an irradiance component on the texture surface of a target object at the time of applying the relighting effect to the target object using coefficients of a spherical harmonic function.

In 1510 in FIG. 15, E(n) represents the intensity of the irradiance component approximated through the coefficients of the spherical harmonic function.

The intensity of the irradiance component may have a value normalized to a specified range. Specifically, in FIG. 15, the intensity of the irradiance component is normalized between 0 and 1.

Radiosity can be derived by multiplying the value of the normalized irradiance component and the value of albedo of the surface of the target object. Here, ρ, the intensity value of the texture surface for each channel, can be set as albedo.

Meanwhile, depending on the irradiance component normalization method, the tendency of the derived radiosity may vary.

As an example, in 1520 of FIG. 15, a graph shows that, when the irradiance component E is linearly distributed, the intensity value ρ of the textured surface is converted to radiosity I according to the slope ∇E(n) of E(n). In 1520 of FIG. 15, the horizontal axis represents the intensity value ρ of the input texture surface and the vertical axis represents the value of radiosity I.

In a case in which the value of the slope ∇E(n) of the irradiance component is 1, the value ρ is directly mapped to the value I, which means that there is no change in brightness. If the value of the slope ∇E(n) is greater than 1, the slope of the graph increases, and the overall texture surface becomes brighter compared to the same ρ value. However, in this case, since a maximum brightness value is saturated, the texture intensity cannot be expressed as indicated by 1521, resulting in a loss in the amount of color expression information of the radiosity I.

On the other hand, in a case in which the slope ∇E(n) of the irradiance component is less than 1, the slope of the graph decreases and the overall texture surface becomes darker compared to the same ρ value. In this case, as indicated by 1531, a certain portion of the radiosity I is not expressed, resulting in a loss in color expression information.

Meanwhile, in the example shown in 1520 of FIG. 15, the rate of change of the irradiance component is linear, and change in I is constant compared to change in ρ.

In the example shown in 1530 of FIG. 15, the irradiance component E is illustrated as E^' nonlinearly normalized through a graph. In the example shown in 1530 of FIG. 15, at positions below 1.0 based on the center point coordinates (1.0, 1.0), the slope increases steeply as the value E increases. On the other hand, above the center point coordinates (1.0, 1.0), the slope gradually decreases as the value E increases.

The final brightness value I excessively decreases as it approaches the minimum value of 0, making it difficult to identify color changes, and excessively increases as it approaches the maximum value of 1.0, making it difficult to identify color changes. Accordingly, as in the example shown in 1530 of FIG. 15, if the amount of change in the irradiance component E relative to the input value p increases at a color value close to 1.0 corresponding to the median, the relighting effect of a heterogeneous object can become clearer. Therefore, in 1530 of FIG. 15, a mathematical function with a sigmoid curve, which is an S-shaped curve, is used to nonlinearly normalize the intensity of the irradiance component during normalization.

Meanwhile, in a case in which heterogeneous object configuration information of a heterogeneous type, such as VPCC, is transmitted as a bitstream for heterogeneous object relighting, best information capable of expressing the relighting effect may be additionally encoded/decoded as metadata in consideration of the texture color distribution of a heterogeneous object and the global color distribution of a target scene. The aforementioned information may include at least one of information indicating the type of a mathematical function for the relighting effect or a coefficient for applying the function.

Additionally, when the encoder encodes information on a spherical harmonic function that can approximate an irradiance environment map, the resolution of an input environment map image used to derive the spherical harmonic function may also be encoded as metadata. Accordingly, the decoder can adaptively apply the relighting effect by taking into account the difference between the resolutions of the target scene and target heterogeneous object and the transmitted resolution.

According to the present disclosure, an irradiance component value at a target position can be restored using information on a spherical harmonic function.

According to the present disclosure, there is an effect of providing a relighting effect to a heterogeneous object inserted into MIV content using an irradiance component at a target position.

The effects that can be obtained from the present disclosure are not limited to the effects mentioned above, and other effects not mentioned can be clearly understood by those skilled in the art from the description below.

What is claimed is:

1. A method of encoding environment maps in a 3D space, the method comprising:

determining a number of the environment maps;

encoding a position of each of the environment maps in the 3D space; and encoding coefficients of a spherical harmonics function for each of the environment maps in the 3D space, wherein the number of coefficients of the spherical harmonics function is adaptively determined based on an order of the spherical harmonics function.

2. The method of claim 1, wherein the method further comprises:

generating metadata for the coefficients of the spherical harmonics function, wherein the metadata comprises order information indicating the order of the spherical harmonics function or number information indicating a number of coefficients of the spherical harmonics function.

3. The method of claim 1, wherein encoding the coefficients of the spherical harmonics function comprises:

Encoding a reuse flag indicating whether previous coefficients of the spherical harmonics function for an environment map in a previous frame is reused for a current environment map in a current frame.

4. The method of claim 3, wherein in response that the reuse flag indicates that the previous coefficients of the spherical harmonic function for the environment map in the previous frame are reused, the coefficients of the spherical harmonics function for the current environment map are determined to be the same as the previous coefficients.

5. The method of claim 3, wherein in response that the reuse flag indicates that the previous coefficients of the spherical harmonic function for the environment map in the previous frame are not reused, each of the coefficients of the spherical harmonics function for the current environment map is explicitly encoded into a bitstream.

6. The method of claim 1, wherein the coefficients of the spherical harmonics function are encoded as 2D array data.

7. A method of decoding environment maps in a 3D space, the method comprising:

determining a number of the environment maps;

determining a position of each of the environment maps in the 3D space; and reconstructing coefficients of a spherical harmonics function for each of the environment maps in the 3D space, wherein the number of coefficients of the spherical harmonics function is adaptively determined based on an order of the spherical harmonics function.

8. The method of claim 7, wherein the method further comprises:

parsing metadata for reconstructing the coefficients of the spherical harmonics, wherein the metadata comprises order information indicating the order of the spherical harmonics or number information indicating a number of coefficients of the spherical harmonics function.

9. The method of claim 7, wherein reconstructing the coefficients of the spherical harmonics function comprises:

determining, based on a reuse flag, whether previous coefficients of the spherical harmonics function for an environment map in a previous frame is reused for a current environment map in a current frame.

10. The method of claim 9, wherein in response that the reuse flag indicates that the previous coefficients of the spherical harmonic function for the environment map in the previous frame is reused, the coefficients of the spherical harmonics function for the current environment map are determined to be the same as the previous coefficients.

11. The method of claim 9, wherein in response that the reuse flag indicates that the previous coefficients of the spherical harmonic function for the environment map in the previous frame is not reused, each of the coefficients of the spherical harmonics function for the current environment map is explicitly decoded from a bitstream.

12. The method of claim 7, wherein the coefficients of the spherical harmonics function are reconstructed by decoding 2D array data.

* * * * *